United States Patent
Ciurdar et al.

(10) Patent No.: US 9,262,413 B2
(45) Date of Patent: Feb. 16, 2016

(54) MOBILE USER INTERFACE FOR CONTEXTUAL BROWSING WHILE PLAYING DIGITAL CONTENT

(75) Inventors: Horia Stefan Ciurdar, London (GB); Jan Svarovsky, London (GB); Timothy Charles Jones, Godmanchester (GB)

(73) Assignee: GOOGLE INC., Mountain View, CA (US)

( * ) Notice: Subject to any disclaimer, the term of this patent is extended or adjusted under 35 U.S.C. 154(b) by 740 days.

(21) Appl. No.: 13/490,246

(22) Filed: Jun. 6, 2012

(65) Prior Publication Data

US 2013/0332830 A1    Dec. 12, 2013

(51) Int. Cl.
*G06F 3/048* (2013.01)
*G06F 17/30* (2006.01)
*G11B 27/34* (2006.01)
*H04N 5/445* (2011.01)

(52) U.S. Cl.
CPC ............ *G06F 17/30* (2013.01); *G06F 17/3005* (2013.01); *G11B 27/34* (2013.01); *H04N 5/44543* (2013.01)

(58) Field of Classification Search
CPC . G11B 27/34; H04N 5/44543; G06F 17/3005
USPC ........................................................ 715/719
See application file for complete search history.

(56) References Cited

U.S. PATENT DOCUMENTS

| | | | | |
|---|---|---|---|---|
| 7,739,584 | B2* | 6/2010 | Vella | H04N 5/445 715/200 |
| 2002/0167538 | A1* | 11/2002 | Bhetanabhotla | G06F 3/0481 715/700 |
| 2005/0005308 | A1* | 1/2005 | Logan | G06Q 30/06 725/135 |
| 2006/0236243 | A1* | 10/2006 | Brain | H04N 7/17336 715/704 |
| 2008/0276272 | A1 | 11/2008 | Rajaraman et al. | |
| 2009/0132921 | A1* | 5/2009 | Hwangbo | G06F 3/0482 715/716 |
| 2009/0164904 | A1* | 6/2009 | Horowitz | G06F 17/30817 715/723 |
| 2009/0187825 | A1 | 7/2009 | Sandquist et al. | |
| 2009/0271283 | A1* | 10/2009 | Fosnacht | G06Q 20/123 705/26.1 |
| 2010/0175017 | A1 | 7/2010 | Kenna, III et al. | |
| 2012/0159327 | A1* | 6/2012 | Law | H04N 21/47217 715/716 |
| 2013/0275908 | A1* | 10/2013 | Reichard | G06F 3/0481 715/777 |

FOREIGN PATENT DOCUMENTS

| | | |
|---|---|---|
| JP | 2009-159639 A | 7/2009 |
| KR | 10-2008-0077299 A | 8/2008 |
| WO | WO 2013/184823 A2 | 12/2013 |

OTHER PUBLICATIONS

International Search Report and Written Opinion from PCT/US2013/044341 mailed Jun. 5, 2013.

* cited by examiner

*Primary Examiner* — Anil Bhargava
(74) *Attorney, Agent, or Firm* — Lowenstein Sandler LLP

(57) ABSTRACT

System and methods of presenting multiple contexts, while continuing playback of digital content, such as a digital video, are presented. A user interface (UI) with multiple portions is provided to a user. The digital content is played in the first portion of the UI. The second portion of the UI includes a list of context items associated with the digital content. A user selection of a context item is received and a next context associated with the selected context item is displayed in a next portion of the UI, while playback of the digital content continues.

21 Claims, 10 Drawing Sheets

MOBILE USER INTERFACE FOR CONTEXTUAL BROWSING WHILE PLAYING DIGITAL CONTENT

TECHNICAL FIELD

Embodiments of the present invention relate to the field of digital content and, more particularly, to a user interface for contextual browsing while playing the digital content.

BACKGROUND

The use of digital content is now prevalent in computing devices such as computers, smartphones, laptops computers, tablet computers, personal digital assistants (PDAs), cell phones, portable media players, etc. Digital content includes digital music, digital images, and digital videos. The digital content may be streaming content or locally stored content. Streaming content is content which is not stored locally on a computing device in advance, but rather, is received by and presented to the user while being received from another computing device (e.g., a content server). Locally stored content is content which is stored in a local memory (e.g., a hard disk) of the computing device.

When a user views digital content, a variety of information related to the digital content may be displayed to the user. For example, biographical information about the author or originator of a digital video may be displayed to the user, videos which are related to the currently playing video (e.g., similar videos or videos from the same author) may be displayed to the user, comments about the video may be displayed to the user, a synopsis of the video may be displayed to a user, other authors or originators of related content may be displayed to a user, topics which are related to the subject, theme or topic of the video (e.g., related topics) may be displayed to a user, etc. The information related to the digital content may be referred to as the "context" of the digital content. The context may be displayed to the user in one portion of the UI, while the video plays in another portion of the UI. The context may be displayed using a variety of menus, tabs, lists, grids, scroll bars, and/or other user interface elements.

A user may select a context item (e.g., an item or a piece of information) from the context. For example, the user may view a list of related authors or originators of videos, and may select one of the related authors (e.g., another context item). When the user selects a related author, the user leaves the current context (e.g., the context of the current playing video) and a new context (e.g., information related with the selected, related author) is displayed to the user. Many mobile computing devices (e.g., cell phones, smartphones, personal digital assistants (PDAs), or tablet devices) may have smaller screen space (e.g., smaller screens) than desktop computing devices. Because of the smaller screen space, displaying context information for digital content and/or selected context items may be more cumbersome. Generally, playback of the current video is interrupted in order to display the new context to the user. For example, if a video is currently playing and the user selects a related context item (e.g., a related artist) from the current context, a new context associated with the related context item is displayed to the user and the currently playing video is stopped in order to display the new context to the user. Because of the transition from one context to another context (e.g., the context of a currently playing video to the context of a related context item), the user may be unable to continue viewing the video while browsing new context associated with a context item from a previous context.

SUMMARY

In one embodiment, a method of presenting multiple contexts while continuing playback of a digital video is presented. A UI is provided and the UI plays digital content for a user in a first portion of the UI. A list of context items associated with the digital context is presented in a second portion of the UI. A user selection of a context item from the list of context items may be received. Data associated with the selected context item may be displayed in a third portion of the UI while continuing playback of the digital content in the first portion of the UI. A second user selection of a second context item from the data associated with the selected context item may be received. The data may include a second list of context items associated with the selected context item. Second data associated with the second selected context item is presented in a fourth portion of the UI, while continuing playback of the video in the first portion of the UI. The third portion of the UI and the fourth portion of the UI are accessible to the user.

In additional embodiments, computing devices for performing the operations of the above described embodiments are also implemented. Additionally, in embodiments of the invention, a computer readable storage media may store instructions for performing the operations of the embodiments described herein.

BRIEF DESCRIPTION OF THE DRAWINGS

The present invention will be understood more fully from the detailed description given below and from the accompanying drawings of various embodiments of the invention.

DETAILED DESCRIPTION

Embodiments of the invention pertain to user devices that provide a user interface (UI) with multiple portions. The UI may allow a user to identify digital content, such as a digital video, to play. The digital content is played in a first portion of the UI. Context information (e.g., related videos, related artists, related authors/originators of content, related topics associated with the video, comments about the digital content, etc.) associated with the digital content is displayed in the second portion of the UI. The context information may include multiple context items. For example, each related video, each related artist, each related topic, each related author/originator, and/or each comment may be a context item.

When a user selection of one of the context items is received, a new context associated with the selected context item is presented in a new portion of the UI. The new portion of the UI may be layered on top of the previous portions of the UI. Alternatively, the size of the second portion of the UI may be decreased (e.g., minimized) to provide space for the third portion of the UI to be displayed. Subsequently, the UI may receive additional selections of context items, and may provide additional portions to present new contexts, each additional portion of the UI displaying context information associated with a context item selected from a previous context. Alternatively, the user may switch between the multiple portions of the UI, to view the context information associated with selected context item for the corresponding portion of the UI.

Embodiments of the invention provide users with a convenient mechanism for browsing multiple contexts while continuing playback of a digital video. This mechanism is especially useful for computing devices that have smaller screen space for displaying data (e.g., mobile phones and tablets).

Figure 1:
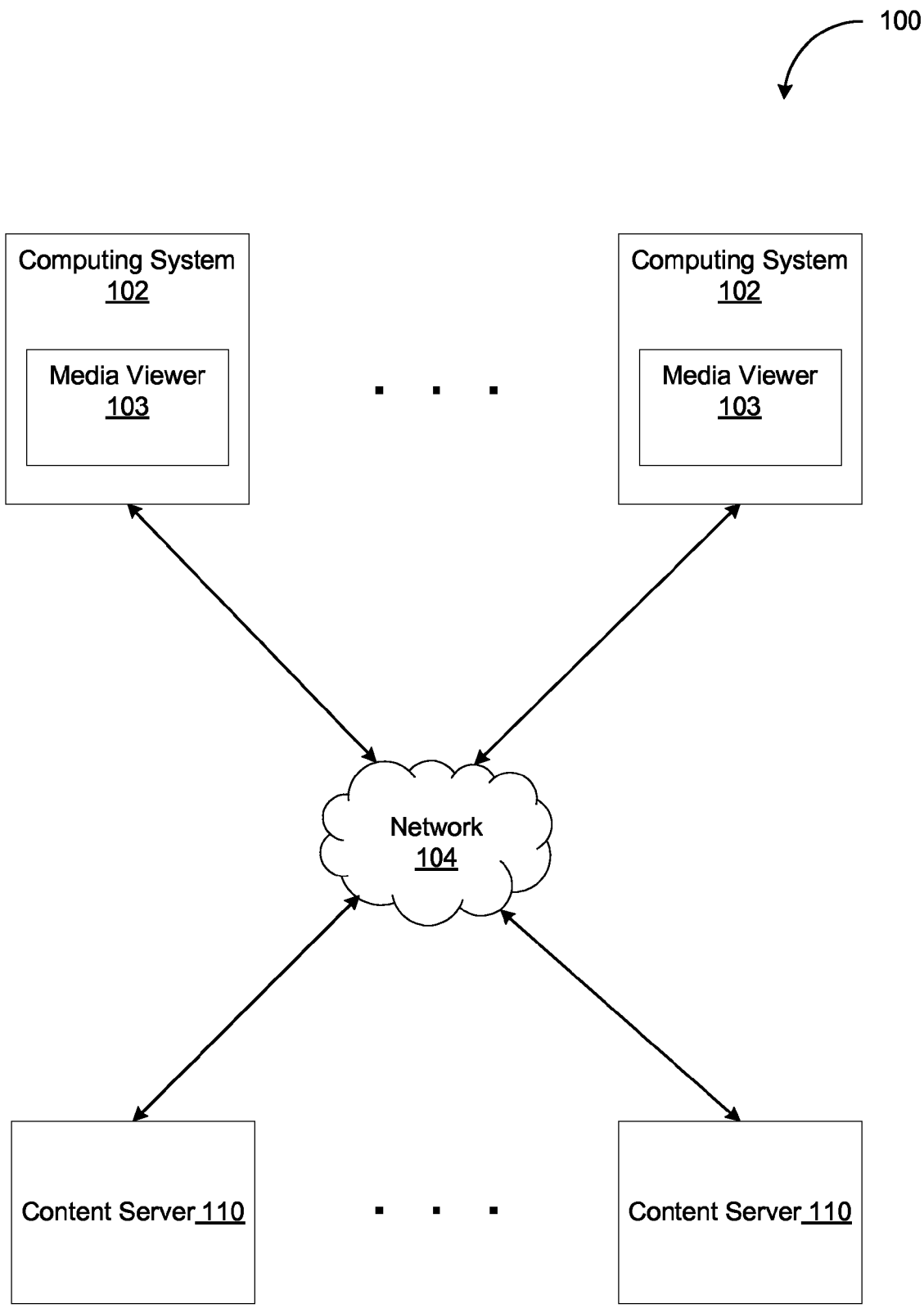
FIG. 1 illustrates an exemplary system architecture, in accordance with one embodiment of the present invention.

FIG. 1 illustrates an exemplary system architecture 100, in accordance with one embodiment of the present invention. System 100 includes computing systems 102 in communication with (e.g., coupled to) content servers 110 over a network 104. Each computing system 102 includes a media viewer 103. In on embodiment, the network 104 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The content servers 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. In one embodiment, the content servers 110 may provide digital content (e.g., digital video, streaming video, images, digital music, streaming music, etc.) to one or more of the computing devices 102. For example, the content server 110 may provide data (e.g., video data) for a streaming video requested by a user to the computing system 102 via the network 104. Similar to the content servers 110, the computing systems 102 may also include computing devices that have a wide range of processing capabilities (e.g., a personal computer (PC), a personal digital assistant (PDA), a smart phone, a laptop computer, a netbook computer, a tablet device, a cellular phone, etc.).

As discussed earlier, each computing system 102 includes a media viewer 103. In one embodiment, the media viewer 103 may be an application and/or component used to play digital videos and/or other digital media (e.g., images, music, etc.). The media viewer 103 may provide a user interface (UI) which allows a user to select and play digital content (e.g., digital videos or music). The UI may facilitate user selection of digital content, playing of the digital content, and/or viewing of information related to the digital content (e.g., the context of the digital content). The UI may have multiple portions. Digital content (e.g., a digital video) may be displayed (e.g., played) in a first portion of the UI. Initial context information for the digital content may be displayed in a second portion of the UI. The initial context information may include one or more context items (e.g., an initial list of context items) which a user may select using the UI. For example, the initial context information may include, but is not limited to, comments about the digital content, information about the author or originator of the digital content, related digital content (e.g., related videos or music), authors of related digital content (e.g., related artists), activities of a user, a playlist of a user, etc. Each comment, author, related video, related author, activity, topic, and/or playlist, etc., may be a context item. In one embodiment, the context items may be displayed in the second portion of the UI using any combination of lists, tabs, tables, scroll bars, etc.

A user may select a context item from the initial context information (e.g., initial list of context items). In one embodiment, a display screen for the computing system 102 (e.g., a liquid crystal display (LCD), a capacitive touch screen, a resistive touch screen, a light emitting diode (LED) screen, etc.), may have smaller screen space (e.g., a 4-inch diameter screen) than that of a larger computing device (e.g., a laptop computer or desktop computer).

As discussed above, conventionally, when a user selects a context item (e.g., a related artist) from the initial list of context items, a media viewer would generally stop displaying the digital content (e.g., stops playing a video) in order to display the context associated with the selected context item. For example, if a video is playing on the first portion of the UI and related artists are displayed in the second portion of the UI, a conventional media viewer would typically stop playback of the video in the first portion of the UI when the user selected a related artist, in order to display context information for the related artist. Embodiments of the present invention address this problem by allowing a user to browse multiple contexts while continuing playback of a digital video. In particular, when the user selects a context item from the initial list of context items displayed in the second portion of the UI, the new context (e.g., a second context including a new list of context items) associated with the selected context item is displayed to the user in a third portion of the UI while continuing playback of the digital content in the first portion of the UI. In one example, the third portion of the UI may be provided on top of (e.g., overlaying) the second portion of the UI. In another example, the size of the second portion of the UI may be reduced (e.g., the second portion of the UI may be minimized), such that the third portion of the UI may be displayed simultaneously with the second portion of the UI (e.g., the second portion of the UI is minimized and a part of the third portion of the UI is displayed under the second portion).

Subsequently, the user may select an additional context item from the new list of context items (e.g., from the second context). In response, additional context information (e.g., a subsequent list of context items) associated with the additional context item may be displayed in a fourth portion of the UI. In one example, similar to the third portion of the UI, the fourth portion of the UI may be provided on top of (e.g., may overlay) both the second and third portion of the UI. In another example, the size of the third portion of the UI may be reduced (e.g., the third portion of the UI may be minimized), such that the fourth portion of the UI may be displayed simultaneously with the second and third portions of the UI (e.g., a part of the fourth portion of the UI is displayed under the minimized second and third portions of the UI).

In one embodiment, a user may continue to select context items from the lists of context items (e.g., contexts) displayed in the UI. As each subsequent context item is selected, subsequent context information (e.g., a list of subsequent context items for the subsequent context) is displayed in a new portion of the UI. The new portions of the UI may be displayed on top of (e.g., may overlay) the previous portions which contain previous contexts for previously selected context items. In this disclosure, different contexts are referred to as "context levels," where each subsequent context level contains a list of context items associated with a previous context item selected from the previous context level (optionally with the exception of the initial (first) context level which is associated with the digital content displayed in the first portion of the UI). For example, the third context level contains a list of context items associated with a context item selected from the second context level. Exemplary UIs and portions of UIs are discussed in more detail below in conjunction with FIGS. 3A-3D.

Figure 2:
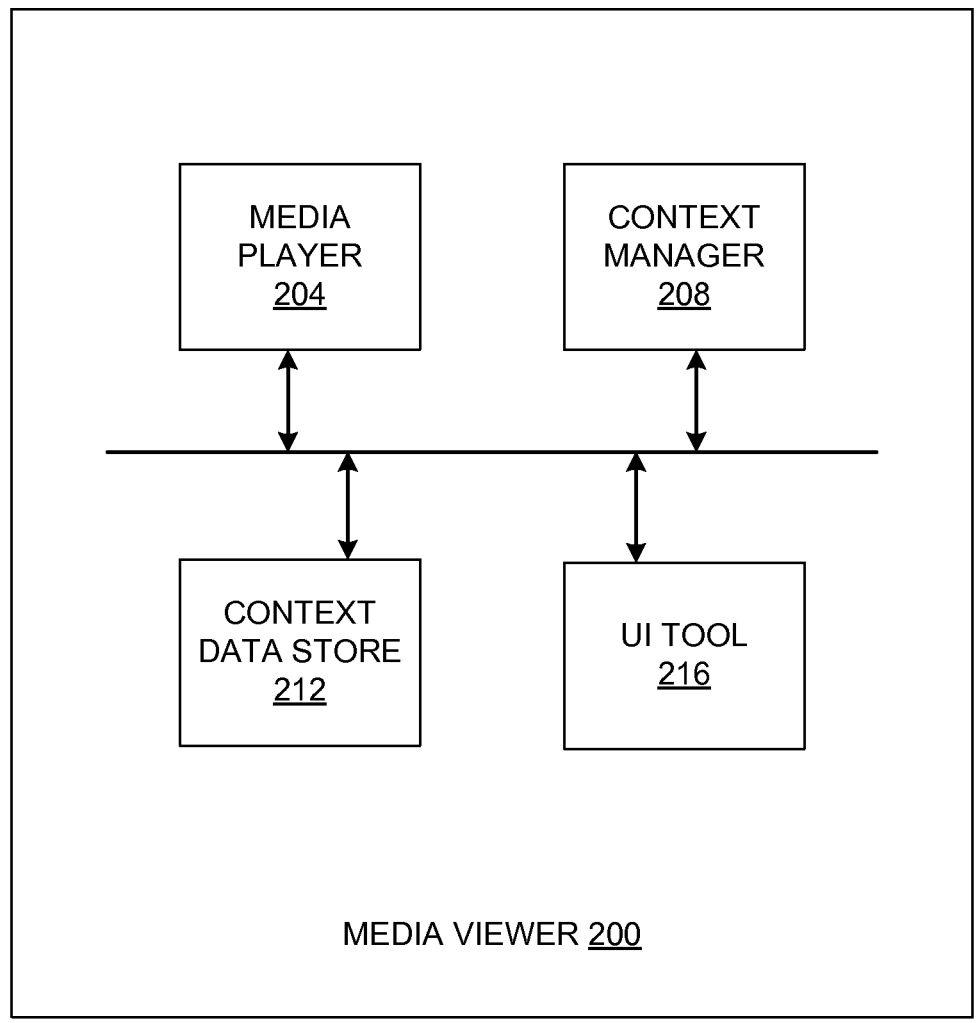
FIG. 2 illustrates a media viewer, in accordance with one embodiment of the present invention.

FIG. 2 illustrates a media viewer 200, in accordance with one embodiment of the present invention. The media viewer 200 may include a media player 204, a context manager 208, a data store 212, and a UI tool 216. More or less components may be included in the media viewer 200 without loss of generality.

The media player 204 may present (e.g., play or display) digital content to a user of the computing device. For example, the media player 204 may play a digital video selected by the user. In another example, the media player 204 may play digital music selected by the user. The media player 204 may be capable of displaying and/or playing multiple types of videos, music, and images to the user. In one embodiment, the media player 204 may also include a variety of other components which may be used to present the digital content to the user. For example, the media player 204 may include different video codecs (e.g., an H.264 codec or a Motion Picture Experts Group (MPEG) codec) which may be used to encode, decode, and play digital videos. In another example, the media player 204 may include audio codecs (e.g., an MPEG audio layer 3 (MP3) codec or a wave codec) which may be used to encode, decode and play digital music. In a further example, the media player 204 may include different image codecs (e.g. a Joint Photographic Experts Group (JPEG) codec or a Graphics Interchange Format (GIF) codec) which may be used to encode, decode, and display images.

The context manager 208 may manage the contexts for digital content and/or a selected context item. In one embodiment, the context manager 208 may obtain context information for a particular digital content that is played by the media player 204. For example, when a user selects a digital video, the context manager 208 may obtain context information for the digital video such as related artists, related videos, related topics, related originators/authors of content, related comments, etc. In another embodiment, the context manager 208 may process user input received from the user of the computing system 102. For example, the context manager 208 may process a user input identifying a digital video, and the context manager 208 may obtain context information for the digital video. In another example, the context manager 208 may process a user input indicating a selection of a particular context item (e.g., a related artist), and the context manager 208 may obtain context information associated with the selected context item.

In one embodiment, the context manager 208 may track the context information for multiple contexts as the user selects different contexts (e.g., browses through different contexts). For example, if a user starts with selection of digital video, the context manager may manage the context information associated with the digital video. If the user selects a related artist (e.g., a context item), the context manager 208 may obtain new context information (e.g., a new context or context level) associated with the related artist (e.g., the selected context item). As the user selects a new context item from each context level, the context manager 208 may manage the context information associated with each context level. In one embodiment, the context manager 208 may obtain context information from content servers 110, shown in FIG. 1. In another embodiment, the context manager 208 may obtain context information from other computing devices (e.g., other servers not shown in the figures) via the network 104 or may obtain the context information from a memory (e.g., a hard disk, flash memory, random access memory (RAM), etc.).

In one embodiment, the context manager 208 may store the context information for the different contexts in the context data store 212. The context information may be accessed by the context manager 208 at a later time, so that the context manager 208 does not need to obtain the context information one the content servers 110 or other computing devices (e.g., the context data store 212 may cache context information). The user may be provided with the option to clear the data in the context data store 212 and/or to prevent the context manager 208 from storing context information in the context data store 212. In one embodiment, the context data store 212 may be any type of storage medium, including, but not limited to, random access memory (RAM), a hard disk, flash memory, a memory card, a CD-ROM, a DVD, etc. Although the context data store 212 is shown as part of the media viewer 200, in other embodiments, the context data store 212 may reside in a different location. For example, the context data store 212 may be stored in a memory and/or a hard drive in the computing system 102.

The UI tool 216 may generate, render, and/or provide the UI presented to the user. In one embodiment, the UI tool may provide a first portion of the UI to display digital content (e.g., to play a video) and may provide additional portions of the UI to display context information associated with the digital content and/or selected context items. In another embodiment, the UI tool 216 may receive user input received from the user of the computing system 102. For example, when the user selects a related artist or a related topic (e.g., a context item) using a touch screen, the UI tool 216 may receive the user input (e.g., the user touch) and may provide the user input to other components of the media viewer 200 (e.g., the context manager 208).

Figure 3A:
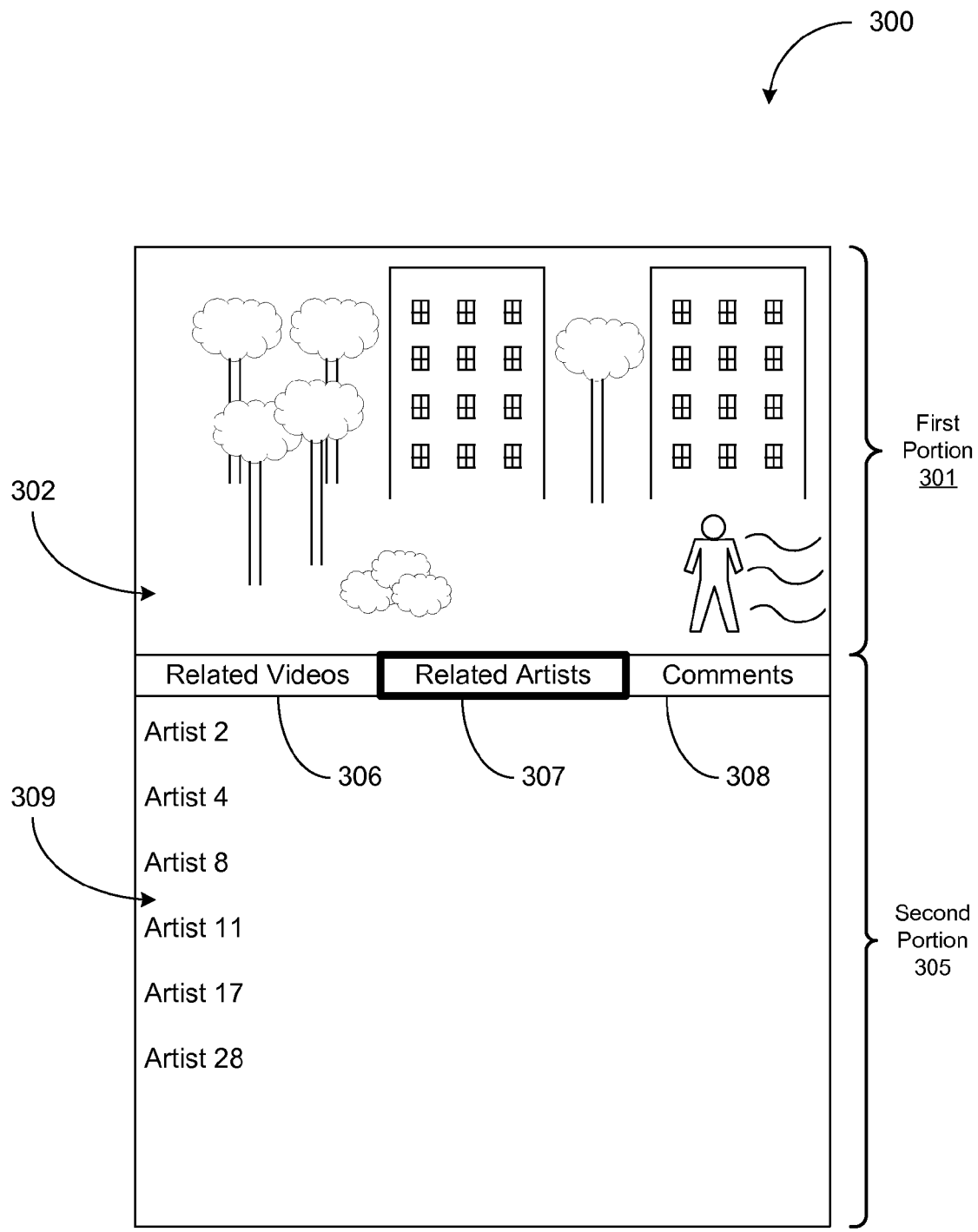
FIG. 3A is an exemplary user interface (UI) in accordance with one embodiment of the present invention.

FIG. 3A is an exemplary user interface (UI) 300 in accordance with one embodiment of the present invention. The UI 300 includes a first portion 301 and a second portion 305. A digital video 302 is played in the first portion 301. Although a digital video 302 is shown in the first portion 301, it should be understood that in other embodiments, other types of digital content may be shown in the first portion 301. For example, an image (e.g., a JPEG) may be shown in the first portion 301. In another example, digital music (e.g., an MP3) may be played in the first portion 301. In one embodiment, the first portion 301 may further comprise UI elements (not shown in the figure), such as buttons, slide bars, menus, to control the playback of the digital content. For example, the first portion 301 may include a volume control slide bar. In another example, the first portion 301 may include buttons, such as "play," "pause," "stop," "fast forward," and "rewind" buttons to control the playback of the digital content.

The context of the digital video 302 (e.g., context information or the list of context items) associated with the digital video is presented in the second portion 305. Context items may include, but are not limited to, related digital content, related authors or originators of digital content, comments, directors, actors, themes, genres, activities of a user, a playlist of a user, etc., related to the digital content. In one embodiment, a context item may be a topic/subject for the video. For example, a video may be a tutorial video about how to repair plumbing. The second portion 305 may include a tab labeled "Topics" (not shown in FIG. 3A) which may list a variety of topics/subjects (e.g., context items) related to the video about how to repair plumbing (e.g., the list of topics/subjects may include "Home Repair," "Plumbing," "Home Improvement," etc.). When a user selects a topic (e.g., Plumbing) the user may be presented with other context items (e.g., authors of videos related to Plumbing, originators of videos related to plumbing, and other videos related to plumbing, etc.) which are related to the selected topic (e.g., the selected context item). Lists of context items associated with the digital video 302 are displayed within multiple tabs 306, 307, and 308. In one embodiment, each tab 306, 307, and 308 may provide for a logical grouping of context items. Tab 306 is labeled "Related Videos" and may include context items such as other digital videos which may be associated to the digital video 302. For example, tab 306 may include similar videos from a same genre as the digital video 302. In another example, tab 306 may include videos which have a similar theme as the digital video 302. Tab 307 is labeled "Related Artists" and may include context items such as other authors and/or originators of content which may be associated to the digital video 302. For example, tab 307 may include other artists from the same genre as the digital video 302. Tab 308 is labeled "Comments" and may include context items such as comments about the digital video 302, from other users.

As shown in FIG. 3A, tab 307 (labeled "Related Artists") is selected by the user. Because tab 307 is selected, context item list 309, which contains the context items grouped in the tab 307, is displayed in the second portion 305. Context item list 309 includes the context items "Artist 2," "Artist 4," "Artist 8," "Artist 11," "Artist 17," and "Artist 28." In one embodiment, if the user selects another tab, the context items grouped in the other tab, may be displayed in the second portion 305. The tabs 306, 307, and 308 provide an efficient and intuitive method for organizing context items into logical groups which may be presented to a user in the second portion 305. Although tabs are shown in the second portion 305, in other embodiments, other types of elements for organizing and present data may be used to present context items to the user. For example, tables, graphs, charts, lists, grids, etc., may be presented in the second portion 305.

Figure 3B:
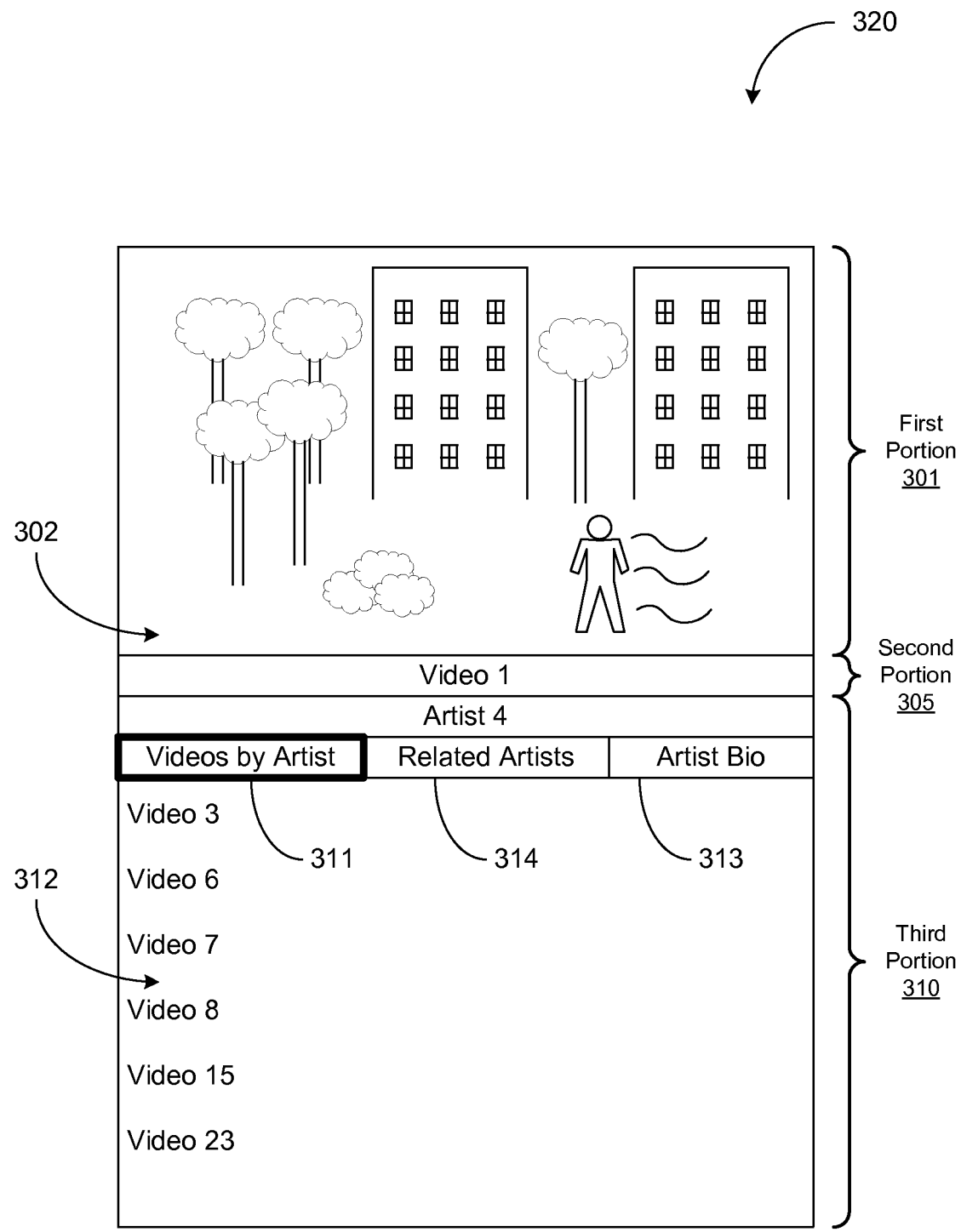
FIG. 3B is an exemplary user interface (UI) in accordance with another embodiment of the present invention.

FIG. 3B is an exemplary user interface (UI) 320 in accordance with another embodiment of the present invention. The UI 320 includes a first portion 301, a second portion 305, and a third portion 310. Referring back to FIG. 3A, the digital video 302 continues playing in the first portion 301. A user selection indicating the context item "Artist 4" from the second portion 305 of the UI 300 shown in FIG. 3A is received. In response to the user selection of the context item "Artist 4," a new context or context level is displayed in the third portion 310. The new context (e.g., context level) includes context items which are related or associated with the context item "Artist 4" selected from the context item list 309 shown in FIG. 3A.

In one embodiment, the third portion 310 may be displayed on top of the second portion 305, such that part of the second portion 305 is obscured by the third portion 310. In another embodiment (not shown), the second portion 305 may be minimized (e.g., reduced in size) such that it takes up a smaller amount of space than shown in FIG. 3A. This may allow for enough space to display the third portion 310 under the minimized second portion 305 in the UI 320, with the minimized second portion 305 covering a part of the third portion 310.

The context items associated with the selected context item "Artist 4" are displayed within multiple tabs 311, 314, and 313. As discussed above, each tab 311, 314, and 313 may provide for a logical grouping of context items. Tab 311 is labeled "Videos by Artist" and may include context items such as other digital videos authored by and/or originating from "Artist 4." The tab 314 is labeled "Related Artists" and may include context items such as other authors and/or originators of content which are related to "Artist 4." The tab 313 is labeled "Artist Bio" and may include biographical information for "Artist 4."

As shown in FIG. 3B, tab 311 (labeled "Videos by Artist") is selected by the user. Because tab 311 is selected, context item list 312, which contains the context items grouped in the tab 311, is displayed in the third portion 310. Context item list 312 includes the context items "Video 3," "Video 6," "Video 7," "Video 8," "Video 15," and "Video 23." If the user selects another tab, the context items grouped into the other tab, may be displayed in the third portion 310.

The UI 320 allows the user to browse a different context without stopping the playback of the digital video 302 in the first portion 301. As shown in FIG. 3B, the user has selected the context item "Artist 4," from the list of context items (e.g., the context) associated with the digital video 302. Rather than stopping playback of the video 302 and using the first portion 301 to display a new context associated with "Artist 4," the digital video 302 continues to play in the first portion 301. The new context (e.g., the context items or information associated with Artist 4) is displayed in the third portion 310 without stopping playing back of the video 302. This allows a user to browse (e.g., select and view) through multiple contexts, without stopping the playback of the digital video 302.

Figure 3C:
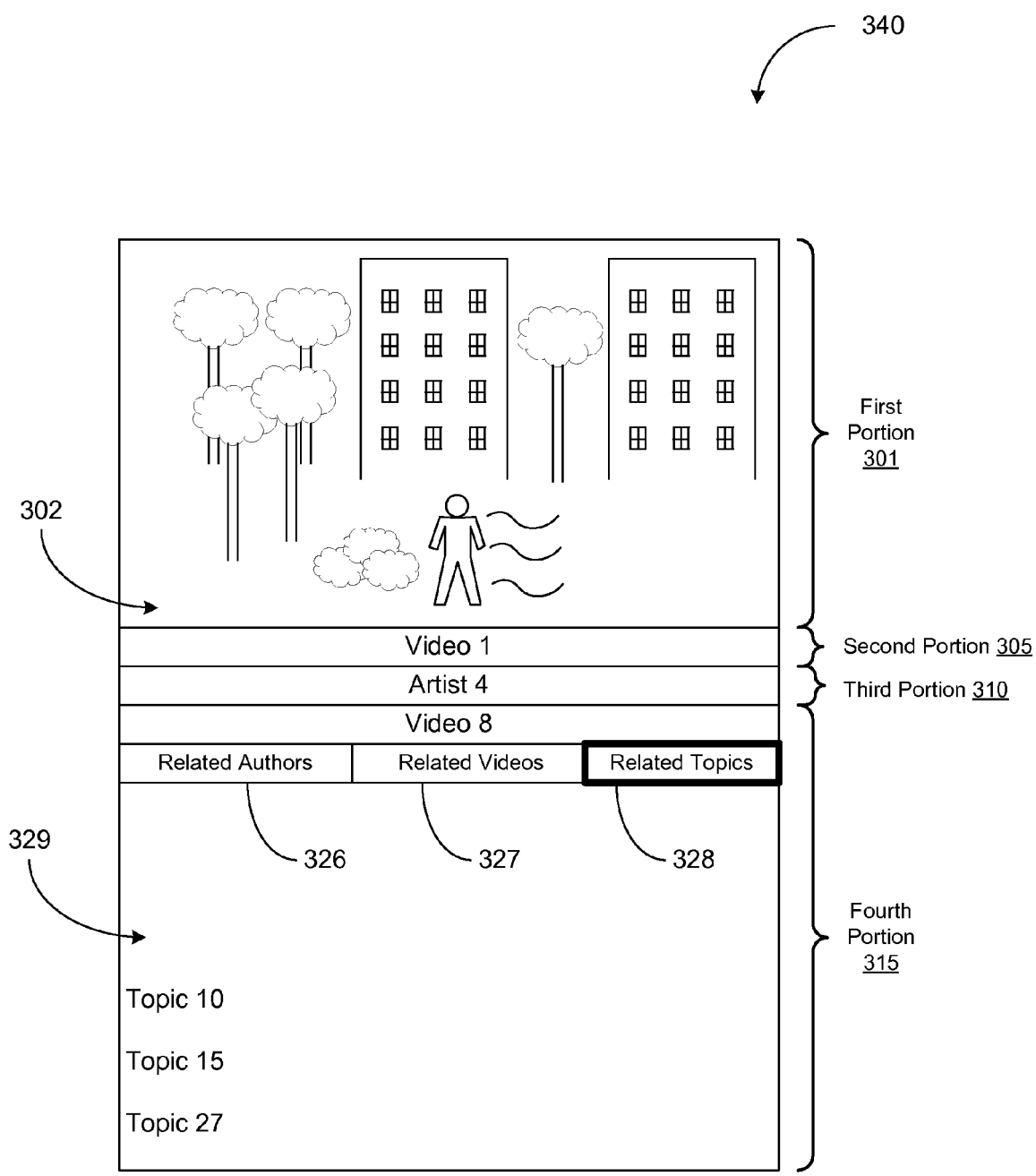
FIG. 3C is an exemplary user interface (UI) in accordance with a further embodiment of the present invention.

FIG. 3C is an exemplary user interface (UI) 340 in accordance with a further embodiment of the present invention. The UI 340 includes a first portion 301, a second portion 305, a third portion 310, and a fourth portion 315. Referring back to FIG. 3B, the digital video 302 continues playing in the first portion 301. A user selection indicating the context item "Video 8" from the third portion 310 of the UI 320 shown in FIG. 3B is received. In response to the user selection of the context item "Video 8," a new context or context level is displayed in the fourth portion 315. The new context (e.g., context level) includes context items which are related or associated with the context item "Video 8" selected from the context item list 312 shown in FIG. 3B.

In one embodiment, the fourth portion 315 may be displayed on top of the third portion 310, such that part of the third portion 310 is obscured by the fourth portion 315. In another embodiment, the third portion 310 may be minimized (e.g., reduced in size) such that it takes up a smaller amount of space than shown in FIG. 3A. This may allow for enough space to display the fourth portion 315 under the minimized second portion 305 and third portion 310 of the UI 340 such that part of the fourth portion 315 is obscured. The context items associated with the selected context item "Video 8" are displayed within multiple tabs 326, 327, and 328.

As discussed above, each tab 326, 327, and 328 may provide for a logical grouping of context items. Tab 326 is labeled "Related Authors" and may include context items such as other authors/originators of content related to "Video 8." The tab 327 is labeled "Related Videos" and may include context items such as other videos which are related to "Video 8." The tab 328 is labeled "Related Topics" and may include other topics/subjects which are related to "Video 8."

As shown in FIG. 3C, tab 328 (labeled "Related Topics") is selected by the user. Because tab 328 is selected, list 329, which contains a list of topics/subjects related to "Video 8," is displayed in the fourth portion 315. List 329 includes "Topic 10," "Topic 15," and "Topic 27," which are related to "Video 8." If the user selects another tab, the context items grouped in the other tab, may be displayed in the fourth portion 315.

Figure 3D:
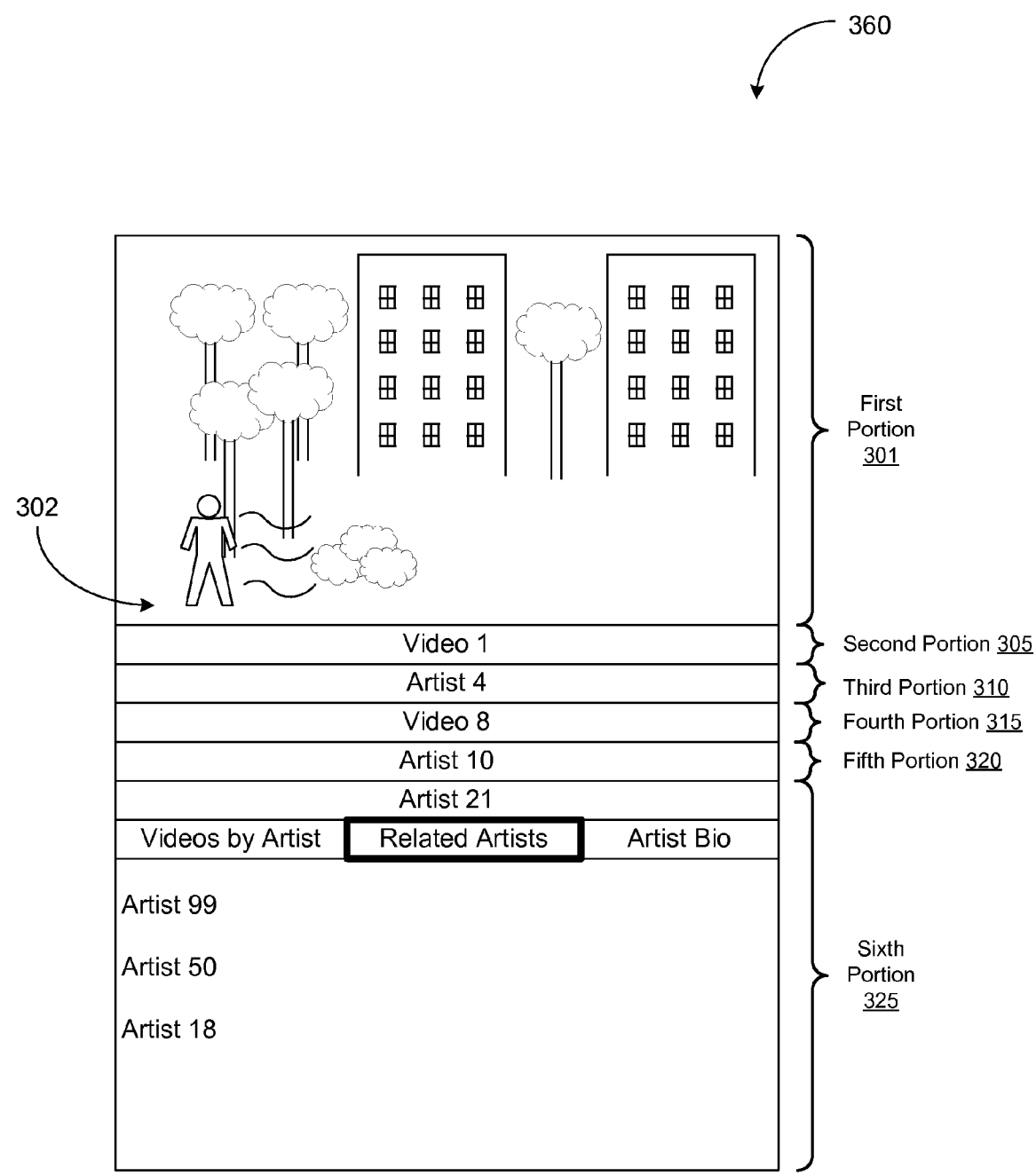
FIG. 3D is an exemplary user interface (UI) in accordance with another embodiment of the present invention.

FIG. 3D is an exemplary user interface (UI) 360 in accordance with another embodiment of the present invention. The UI 360 includes a first portion 301, a second portion 305, a third portion 310, a fourth portion 315, a fifth portion 320, and sixth portion 325. Referring back to FIG. 3C, the digital video 302 continues playing in the first portion 301. The second portion 305 is associated with the context (e.g., context level or context information) for the currently playing video 302. The third portion 310 is associated with the context for the "Artist 4" context item, which was selected from the context associated with "Video 1" (e.g., selected from context list 309 shown in second portion 305 of FIG. 3A). The fourth portion 315 is associated with the context for the "Video 8" context item, which was selected from the context associated with "Artist 4." The fifth portion 320 is associated with the context for "Artist 10." "Artist 10" may be a context item from the tab 326 of FIG. 3C, which contains authors/originators of content (e.g., context items) related to "Video 8." The sixth portion 325 is associated with the context item "Artist 21", which may be a context item from a tab in the fifth portion 320.

As discussed above, when the user selects a context item, a new context (e.g., a new context level) is displayed in a new portion of the UI. In one embodiment, other than the initial context (e.g., the context for "Video 1" shown in the second portion 305), each subsequent context (e.g., each context level) is associated with (e.g., related to) a context item from a previous context (e.g., previous context level). The initial context (e.g., the context for "Video 1") contains context information for "Video 1" and is not associated with a context item from a previous context level, because the initial context is the first context level.

In one embodiment, the user may browse (e.g., transition) to any one of the previous contexts displayed in the previous portions of the UI 360. Thus, the previous contexts (e.g., the previous portions of the UI) remain accessible to the user, so that the user may view context information (e.g., previous context items) for the previous contexts. For example, although the current context is associated with "Artist 21," the user may directly select the context for "Video 8," and the context items (e.g., the context or context information) associated with "Video 8" may be displayed by the UI 360. In one embodiment, the portion of the UI corresponding to the selected context may be expanded in order to display the context items for the selected context. The user may provide input (e.g., a touch screen input, keystroke, etc.) to directly select one of the previous contexts. In another embodiment, the user may reach previous contexts by backtracking through the previous contexts level by level. For example, in order to view the context for "Artist 4", the user may backtrack through the context for "Artist 10" and "Video 8" before reaching the context for "Artist 4." The user may provide user input to backtrack through the previous contexts. For example, the user may use a "back" button or may provide touch screen input (e.g., a swipe gesture on the touch screen) to backtrack to a previous context.

Although the embodiments illustrated in FIGS. 3A-3D show a thicker horizontal bar which displays the text for the different portions of the UI (e.g., the second portion of the UI, the third portion of the UI, the fourth portion of the UI, etc.), it should be understood that in other embodiments, the different portions of the UI may be presented by the UI in different ways. For example, a thinner horizontal bar (without text) may be used to represent each additional portion of the UI, in order to provide more space in the UI to display context items. In another example, multiple portions of the UI (e.g., the second, third, fourth and fifth portion of the UI) may be represented with a single thinner horizontal bar (without text), in order to provide more space in the UI to display context items.

Figure 4:
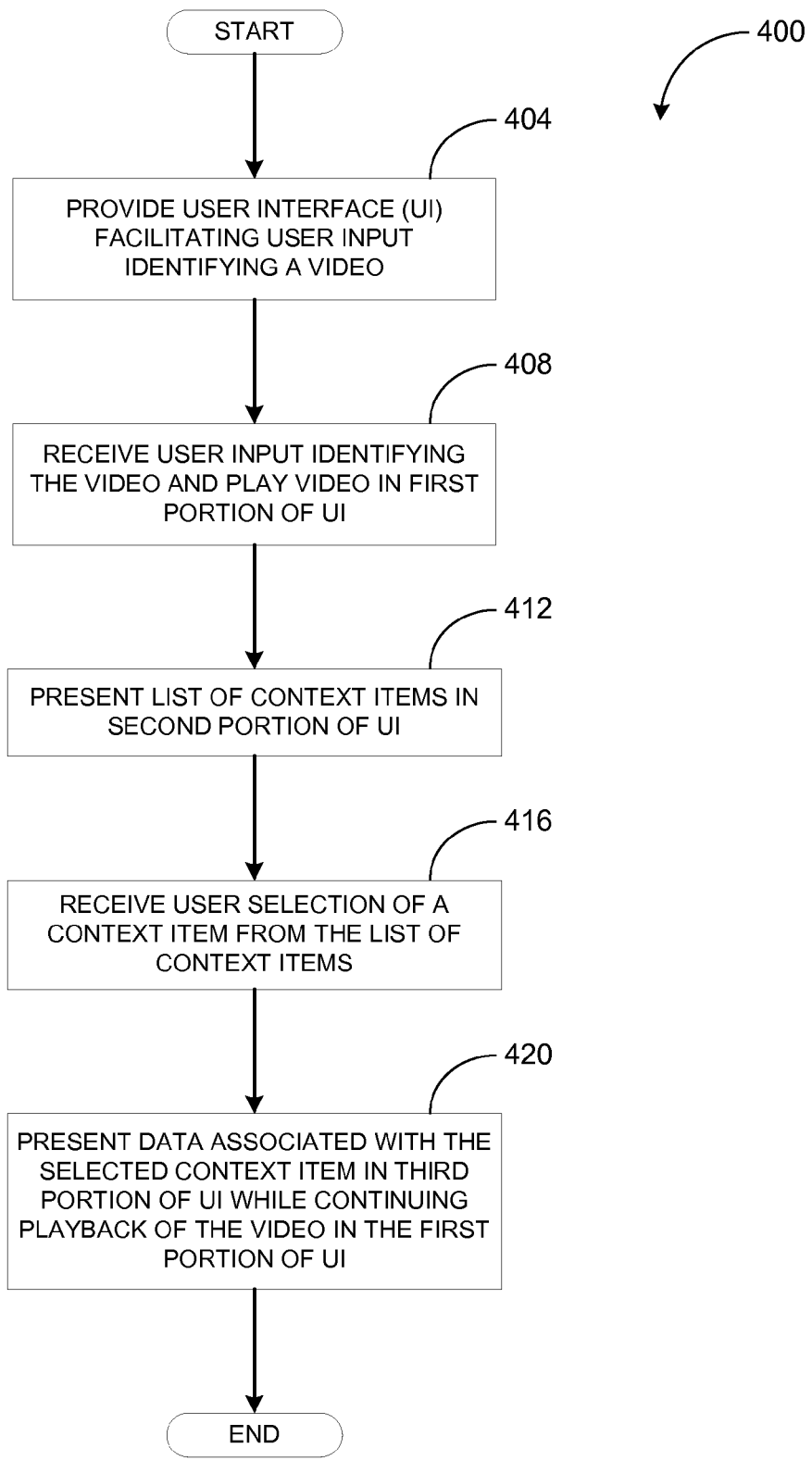
FIG. 4 is a flow diagram illustrating one embodiment for a method of browsing multiple contexts.

FIG. 4 is a flow diagram illustrating an embodiment for a method 400 of browsing multiple contexts. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a computing system (e.g., the computing system 102 of FIG. 1).

Referring to FIG. 4, the method 400 starts with the computing system providing a UI to a user, to facilitate user input identifying a video (block 404). For example, the UI may provide a search field to allow a user to search for videos. In another example, the UI may provide a list of videos to the user. At block 408, user input identifying the video is received from the user and the video (e.g., video 302 in FIG. 3A) is played in a first portion of the UI (e.g., first portion 301 in FIG. 3A). In one embodiment, the user input may be a combination of keystrokes, mouse inputs, and/or touch screen inputs (e.g., a touch or a gesture on a portion of a touch screen). A list of context items (e.g., context item list 309) is presented to the user in a second portion of the UI (e.g., second portion 305 in FIG. 3A) at block 412. The list of context items is associated and/or related to the video playing in the first portion of the UI.

At block 416, a user selection of a context item from the list of context items is received. For example, the user may select a related video context item or related artist context item from the list of context items presented to the user at block 412. Data associated with the selected context item (e.g., a new context or a new context level) is presented in a third portion of the UI (e.g., third portion 310 in FIG. 3B) at block 420. The data associated with the selected context item (e.g., the new context) may include a list of context items (e.g., context item list 312 in FIG. 3B) associated with the context item selected at block 416.

Although a digital video is shown in the flow diagram, it should be understood that in other embodiments, other types of digital content (e.g., digital music, etc.), contexts associated with the other types of digital content, and context items associated with the other types of digital content, may be displayed by the user interface.

Figure 5:
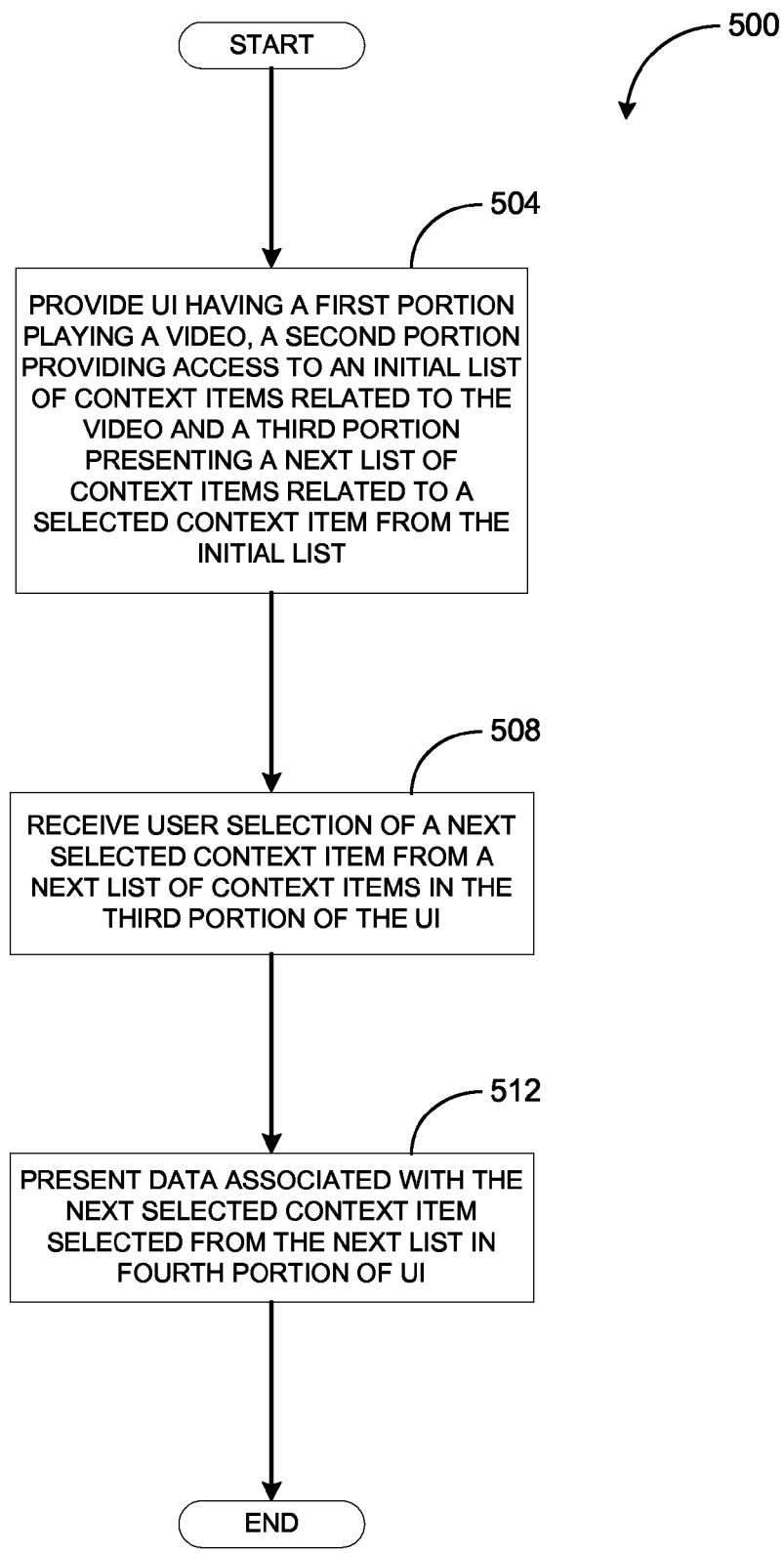
FIG. 5 is a flow diagram illustrating another embodiment for a method of browsing multiple contexts.

FIG. 5 is a flow diagram illustrating another embodiment for a method 500 of browsing multiple contexts. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by a computing system (e.g., the computing system 102 of FIG. 1).

Referring to FIG. 5, the method 500 starts with the providing a UI having a first portion (e.g., first portion 301 in FIG. 3B) playing a video (e.g., video 302), a second portion (e.g., second portion 305 in FIG. 3B) providing access to an initial list of context items related to the video, and a third portion (e.g., third portion 310 in FIG. 3B) presenting a next list of context items related to a selected context item (e.g., Artist 4) from the initial list (block 504). At block 508, a user selection of a next selected context item from the next list of context items in the third portion of the UI, is received. After receiving the user selection of the next context item, data associated with then next context item selected from the next list (e.g., a next context or context level), is displayed in a fourth portion of the UI (e.g., fourth portion 315 in FIG. 3C) at block 512.

Although a digital video is shown in the flow diagram, it should be understood that in other embodiments, other types of digital content (e.g., digital music, etc.), contexts associated with the other types of digital content, and context items associated with the other types of digital content, may be displayed by the user interface.

Figure 6:
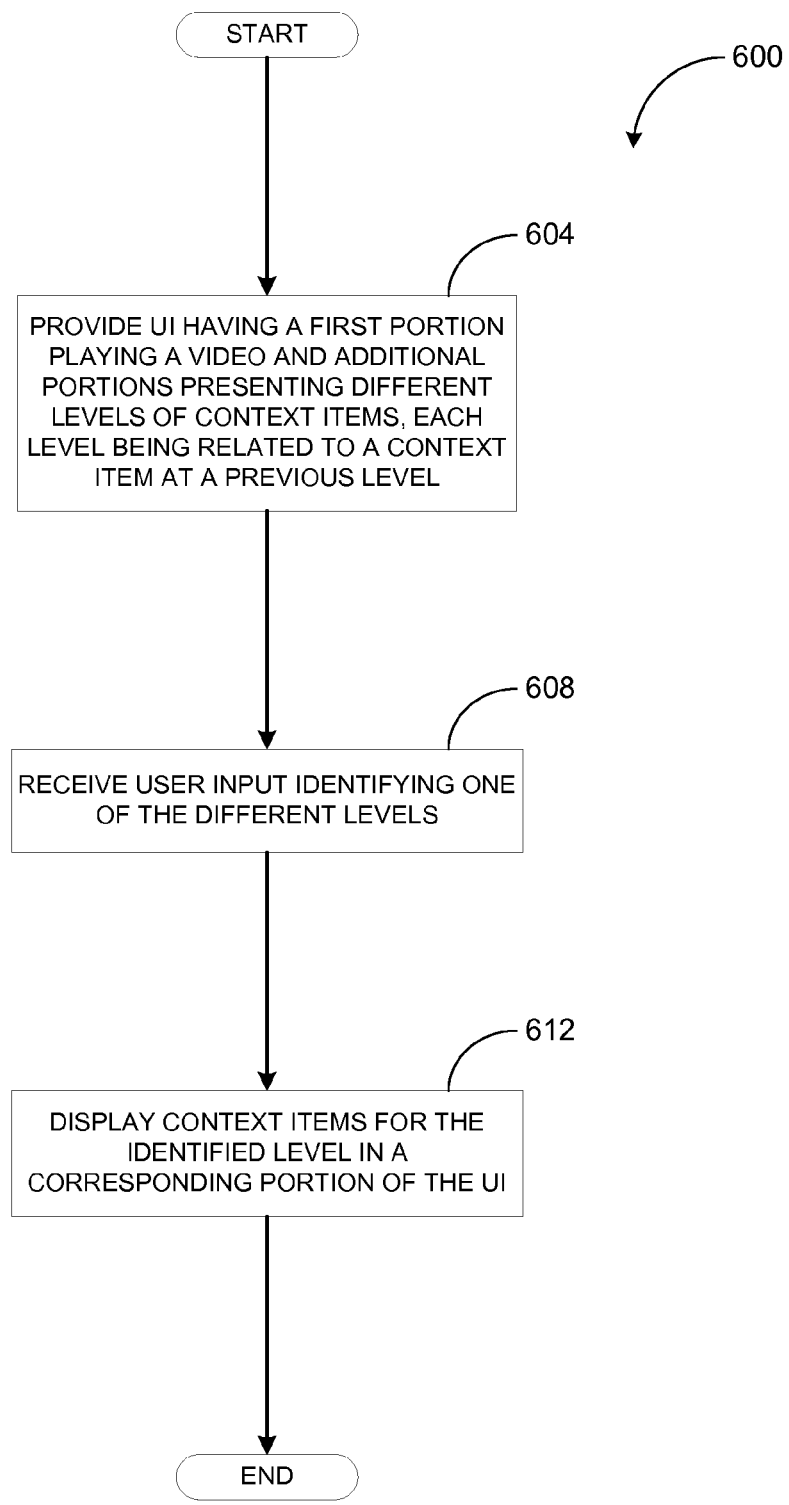
FIG. 6 is a flow diagram illustrating a further embodiment for a method of browsing multiple contexts.

FIG. 6 is a flow diagram illustrating a further embodiment for a method 600 of browsing multiple contexts. The method 600 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 600 is performed by a computing system (e.g., the computing system 102 of FIG. 1).

Referring to FIG. 6, the method 600 starts at block 604 with providing a UI having a first portion (e.g., first portion 301 in FIG. 3D) and additional portions presenting different levels of context items (e.g., different context levels), each level being related to a context item at a previous context level (e.g., portions 310, 315, 320, and 325 in FIG. 3D). User input identifying one of the different context levels is received at block 608. As discussed above in conjunction with FIG. 3D, the user input may be a direct selection of one of the different context levels or the user input may be used to backtrack through previous context levels. At block 612, the context items for the identified context level are displayed in the corresponding portion of the UI. In one embodiment, the portion of the UI associated with the identified context level made larger (e.g., maximized) so that the context items for the identified context level may be displayed on the UI. The other portions of the UI corresponding to other context levels may be minimized to provide space to display the context items for the identified context level. In another embodiment, the user input may be an input to backtrack through one or more context levels, to reach a context level requested by the user.

Although a digital video is shown in the flow diagram, it should be understood that in other embodiments, other types of digital content (e.g., digital music, etc.), contexts associated with the other types of digital content, and context items associated with the other types of digital content, may be displayed by the user interface.

Figure 7:
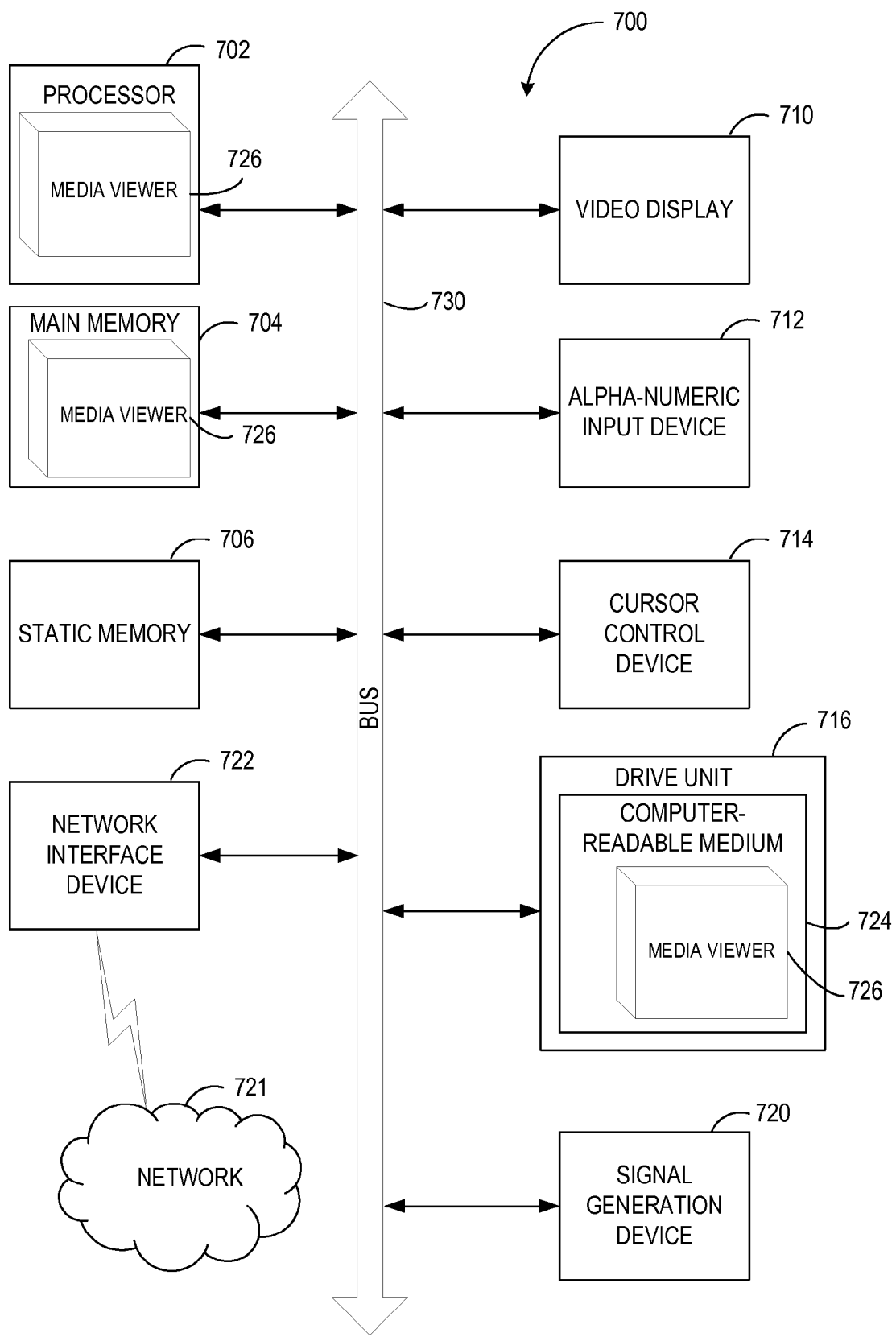
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a smart phone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722 to communicate with a network 721. The computer system 700 also may include a video display unit 710 (e.g., a liquid crystal display (LCD), a touch screen, or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one embodiment, the instructions 726 include instructions for a media viewer, which may correspond to media viewer 200 of FIG. 2. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "presenting," "receiving," "displaying," "playing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
    providing, by a processing device, a user interface playing a digital video for a user in a first portion of the user interface;
    presenting, in a second portion of the user interface, a first set of user interface elements representing a first plurality of context item groups associated with the digital video, and a first list of context items from a selected context item group of the first plurality of context item groups, wherein the first set of user interface elements are presented in the second portion as a first set of tabs; and
    in response to receiving a user selection of a context item from the first list,
        presenting data associated with the selected context item from the first list in a third portion of the user interface while continuing playback of the digital video in the first portion of the user interface, wherein the data associated with the selected context item from the first list comprises a second set of user interface elements representing a second plurality of context item groups associated with the selected context item, and a second list of context items from a selected context item group of the second plurality of context item groups, and
        presenting a hierarchy of contexts accessible during the playback of the digital video, the hierarchy of contexts including a first context corresponding to the first plurality of context item groups associated with the digital video, and a second context corresponding to the second plurality of context item groups associated with the selected context item from the first list.

2. The method of claim 1, further comprising:
    receiving a second user selection of a second context item from the second list of context items associated with the selected context item from the first list; and
    presenting second data associated with the second selected context item from the second list in a fourth portion of the user interface while continuing playback of the digital video in the first portion of the user interface, and adding a third context corresponding to the second selected context item from the second list to the hierarchy of contexts.

3. The method of claim 2, further comprising:
    receiving a user input indicating a selection of one of the second portion of the user interface, the third portion of the user interface, or the fourth portion of the user interface;
    presenting the first list of context items associated with the digital video, the data or the second data, based on the third user input.

4. The method of claim 3, wherein the user input comprises one or more of a keyboard input and a touchscreen input.

5. The method of claim 2, wherein the second set user interface elements are presented in the third portion as a second set of tabs, wherein each context item in the second list of context items is displayed within the second set of tabs, wherein the fourth portion of the user interface comprises a third set of tabs, and wherein each context item in the third list of context items is displayed within the third set of tabs.

6. The method of claim 1, wherein the first plurality of context items groups comprise two or more of:
    a related content group, a comments group, description of the digital video, information about an author of the digital video, and information about an originator of the digital video.

7. The method of claim 1, wherein the user interface is displayed within a screen of a smartphone, a personal digital assistance (PDA), or a cellular phone.

8. A system comprising:
    a memory to store data associated with contexts and context items;
    a processing device, coupled to the memory and configured to:
        provide a user interface playing a digital video for a user in a first portion of the user interface;
        present, in a second portion of the user interface, a first set of user interface elements representing a first plurality of context item groups associated with the digital video, and a first list of context items from a selected context item group of the first plurality of context item groups, wherein the first set of user interface elements are presented in the second portion as a first set of tabs; and in response to receiving a user selection of a context item from the first list, present data associated with the selected context item from the first list in a third portion of the user interface while continuing playback of the digital video in the first portion of the user interface, wherein the data associated with the selected context item from the first list comprises a second set of user interface elements representing a second plurality of context item groups associated with the selected context item, and a second list of context items from a selected context item group of the second plurality of context item groups, and present a hierarchy of contexts accessible during the playback of the digital video, the hierarchy of contexts including a first context corresponding to the first plurality of context item groups associated with the digital video, and a second context corresponding to the second plurality of context item groups associated with the selected context item from the first list.

9. The system of claim 8, wherein the processing device is further configured to:

receive a second user selection from the second list of context items associated with the selected context item from the first list; and present second data associated with the second selected context item from the second list in a fourth portion of the user interface while continuing playback of the digital video in the first portion of the user interface, and add a third context corresponding to the second selected context item from the second list to the hierarchy of contexts.

10. The system of claim 9, wherein the processing device is further configured to:

receive a user input indicating a selection of one of the second portion of the user interface, the third portion of the user interface or the fourth portion of the user interface;

present the first list of context items associated with the digital video, the data, or the second data, based on the third user input.

11. The system of claim 10, wherein the user input comprises one or more of a keyboard input and a touchscreen input.

12. The system of claim 9, wherein the second set of user interface elements are presented in the third portion as a second set of tabs, wherein each context item in the second list of context items is displayed within the second set of tabs, wherein the fourth portion of the user interface comprises a third set of tabs, and wherein each context item in the third list of context items is displayed within the third set of tabs.

13. The system of claim 8, wherein the first plurality of context items groups comprise two or more of:

a related content group, a comments group, description of the digital video, information about an author of the digital video, and information about an originator of the digital video.

14. The system of claim 8, wherein the user interface is displayed within a screen of a smartphone, a personal digital assistance (PDA), or a cellular phone.

15. A non-transitory computer readable storage medium encoding instructions thereon that, in response to execution by a processing device, cause the processing device to perform operations comprising:

providing, by the processing device, a user interface playing a digital video for a user in a first portion of the user interface;

presenting, in a second portion of the user interface, a first set of user interface elements representing a first plurality of context item groups associated with the digital video, and a first list of context items from a selected context item group of the first plurality of context item groups, wherein the first set of user interface elements are presented in the second portion as a first set of tabs; and in response to receiving a user selection of a context item from the first list, presenting data associated with the selected context item from the first list in a third portion of the user interface while continuing playback of the digital video in the first portion of the user interface, wherein the data associated with the selected context item from the first list comprises a second set of user interface elements representing a second plurality of context item groups associated with the selected context item, and a second list of context items from a selected context item group of the second plurality of context item groups, and presenting a hierarchy of contexts accessible during the playback of the digital video, the hierarchy of contexts including a first context corresponding to the first plurality of context item groups associated with the digital video, and a second context corresponding to the second plurality of context item groups associated with the selected context item from the first list.

16. The non-transitory computer readable storage medium of claim 15, wherein the operations further comprise:

receiving a second user selection of a second context item from the second list of context items associated with the selected context item from the first list; and presenting second data associated with the second selected context item from the second list in a fourth portion of the user interface while continuing playback of the digital video in the first portion of the user interface, and adding a third context corresponding to the second selected context item from the second list to the hierarchy of contexts.

17. The non-transitory computer readable storage medium of claim 16, wherein the operations further comprise:

receiving a user input indicating a selection of one of the second portion of the user interface, the third portion of the user interface, or the fourth portion of the user interface;

presenting the first list of context items associated with the digital video, the data, or the second data, based on the third user input.

18. The non-transitory computer readable storage medium of claim 17, wherein the user input comprises one or more of a keyboard input and a touchscreen input.

19. The non-transitory computer readable storage medium of claim 16, wherein the second set of user interface elements are presented in the third portion as a second set of tabs, wherein each context item in the second list of context items is displayed within the second set of tabs, wherein the fourth portion of the user interface comprises a third set of tabs, and wherein each context item in the third list of context items is displayed within the third set of tabs.

20. The non-transitory computer readable storage medium of claim 15, wherein the first plurality of context items groups comprise two or more of:
   a related content group, a comments group, description of the digital video, information about an author of the digital video, and information about an originator of the digital video.

21. The non-transitory computer readable storage medium of claim 15, wherein the user interface is displayed within a screen of a smartphone, a personal digital assistance (PDA), or a cellular phone.

* * * * *